(12) United States Patent
Van De Wijdeven

(10) Patent No.: US 8,199,055 B2
(45) Date of Patent: Jun. 12, 2012

(54) METHOD AND SYSTEM FOR LOCATING AN OBJECT ON A SURFACE

(75) Inventor: Sander Bernard Francis Van De Wijdeven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 384 days.

(21) Appl. No.: 12/524,728

(22) PCT Filed: Jan. 23, 2008

(86) PCT No.: PCT/IB2008/050228
§ 371 (c)(1),
(2), (4) Date: Jul. 28, 2009

(87) PCT Pub. No.: WO2008/093258
PCT Pub. Date: Aug. 7, 2008

(65) Prior Publication Data
US 2010/0045530 A1 Feb. 25, 2010

(30) Foreign Application Priority Data
Jan. 29, 2007 (EP) .................................... 07101284

(51) Int. Cl.
*G01S 3/02* (2006.01)

(52) U.S. Cl. ...................................................... 342/463
(58) Field of Classification Search .................. 342/457, 342/458, 463–465; 455/456.1, 457
See application file for complete search history.

(56) References Cited

U.S. PATENT DOCUMENTS

| 6,761,634 B1 | 7/2004 | Peterson et al. |
| 2002/0067348 A1 | 6/2002 | Masters et al. |
| 2002/0075243 A1 | 6/2002 | Newton |
| 2005/0251800 A1 | 11/2005 | Kurlander et al. |
| 2006/0224598 A1 | 10/2006 | Thielman et al. |

FOREIGN PATENT DOCUMENTS

| WO | 9713563 A1 | 4/1997 |
| WO | 2006033036 A2 | 3/2006 |
| WO | 2006095320 A2 | 9/2006 |

*Primary Examiner* — Dao Phan

(57) ABSTRACT

A method of locating an object (3;42) placed on a surface (2;24) includes identifying normally clear lines of sight blocked by the object (3;42) by evaluating responses of the receivers of at least some of pairs of a transmitter and a receiver able to detect a signal from the transmitter. At least one element of one of the pairs of which the response of the receiver is evaluated is included in a further object (6;32), which is movable across the surface (2;24).

17 Claims, 8 Drawing Sheets

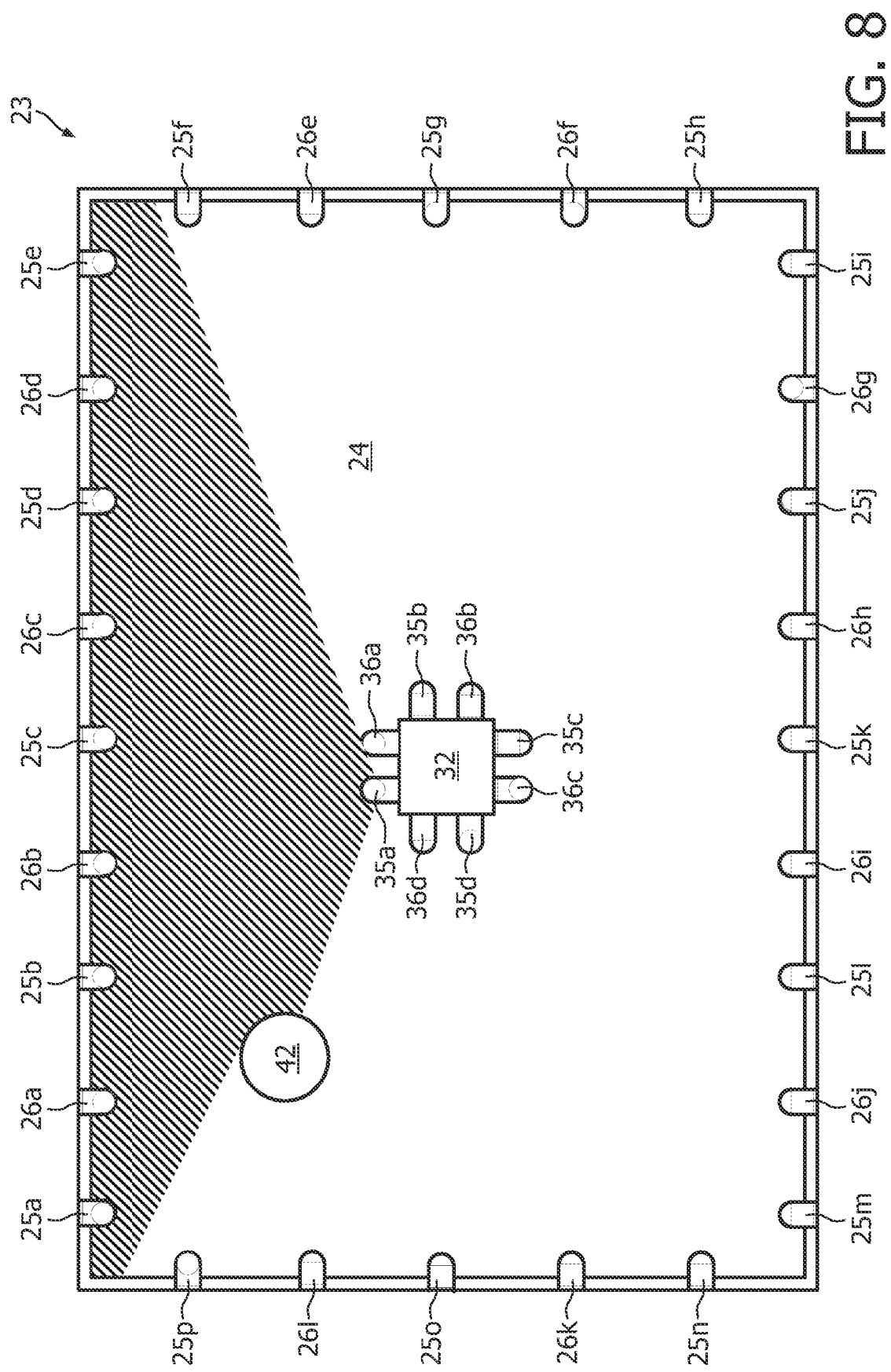

_US 8,199,055 B2_

METHOD AND SYSTEM FOR LOCATING AN OBJECT ON A SURFACE

FIELD OF THE INVENTION

The invention relates to a method of locating an object placed on a surface, and a system for locating an object placed on a surface. The invention also relates to an object for movable arrangement on or over a surface, and a computer programme.

BACKGROUND OF THE INVENTION

WO 2006/095320 discloses a method for detecting the location, shape and size of at least one object placed on a plane within the touch sensor boundaries of a touch screen. The touch screen display includes on its periphery, N light transmitters and M sensors. The method is generally comprised of two stages: a calibration stage and an operational stage. During the calibration stage, as each light transmitter is switched on during its respective turn-on time, the light beam that is cast may be detected by certain ones of the sensors. For each light transmitter, the identification of the sensors that detect the respective light transmitter's light beam is recorded as calibration data. Non-calibration data is recorded over a cycle of operation in the presence of an object. A comparison is made of the calibration data and non-calibration data allowing the shadow area cast by the object to be determined. In certain embodiments, the overall measurement accuracy may be increased by increasing the density of transmitters and/or receivers in certain areas of the screen where detection proves to be less accurate than other areas. This non-even configuration of transmitters and/or receivers can compensate for the less accurate detection.

The non-even configuration is less appropriate for remedying a decrease in accuracy caused by one object casting a shadow on another object to be detected.

SUMMARY OF THE INVENTION

It is desirable to provide a method, system, object and computer programme of the types defined in the opening paragraphs that allow relatively accurate detection of a particular object in an area of the surface where other objects are liable to obstruct lines of sight that would otherwise have been blocked by that particular object.

The method according to the invention comprises steps of:
providing a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other,
activating at least some of the wireless transmitters in the presence of the object, and
identifying normally clear lines of sight blocked by the object by evaluating responses of the receivers of at least some of the pairs of a transmitter and a receiver able to detect a signal from the transmitter, wherein at least one element of one of the pairs of which the response of the receiver is evaluated is included in a further object, which further object is movable across the surface.

Objects placed on the surface may include objects placed over, but not touching, the surface. The term encompasses animate and inanimate objects.

Because at least some of the lines of sight are at an angle to each other, it is possible to locate the object in two dimensions by identifying normally clear lines of sight blocked by the object. Evaluating responses of the receivers of at least some of the pairs of a transmitter and a receiver able to detect a signal from the transmitter allows the blocked ones of the normally clear lines of sight to be identified. Because at least one element forming one of the pairs of which the response of the receiver is evaluated is included in a further object, movable across the surface, additional, shorter lines of sight can be provided that stay clear of other objects on the surface. An added advantage is that the density of normally clear lines of sight can be increased locally only where needed, so that the method is relatively efficient compared to, for example, an indiscriminate increase in the number of wireless receivers and transmitters.

An embodiment includes establishing a communication link between the further object and a control apparatus associated with the surface.

The communication link allows the elements included in the further object to be activated at the appropriate times and/or their response signals to be transmitted to a central logic unit for determining at least the position of the object to be located. It further allows the use of a varying number of further objects including wireless transmitters and/or receivers, because the presence of these further objects can be discovered.

In a variant, the communication link is a wireless communication link.

An effect is that the footprint of the further object, representative of the area occupied by the further object itself, need only be limited.

In an embodiment, a control apparatus locates the further object on the surface.

An effect is that at least approximate locations of lines of sight terminating at the further object can be determined. This improves the accuracy with which the position of the actual object to be located can be determined. In this embodiment, it is not necessary, for example, to restrain the movements of the further object to only those movements that do not alter the orientation of lines of sight terminating at the further object, or to use directional receivers.

An embodiment, wherein the further object signals its presence to the control apparatus, includes:
registering the further object including the at least one element; and
locating the further object on the surface upon its registration.

An effect is that the method can employ a varying number of further objects including wireless transmitters and/or receivers.

An embodiment of the method includes determining an orientation of the further object relative to a co-ordinate system fixed with respect to the surface.

An effect is that, for a known configuration of the further object, the areas of the surface covered by light beams from transmitters included in the further object and/or the areas covered by incident light receivable by receivers included in the further object, can be determined.

In an embodiment, the further object is provided with plurality of edges at an angle to each other in a plane parallel to the surface, including determining the shape of the further object by identifying normally clear lines of sight blocked by the further object and defined by pairs of a transmitter and a receiver arranged around the further object.

An effect is that the orientation of the further object is determined, without the need for an auxiliary sensor system.

For a known distribution of transmitters and/or receivers around the edges of a further object of finite extent, the orientation of the further object provides information about the orientation of lines of sight terminating at the further object in relation to a co-ordinate system fixed with respect to the surface. This embodiment is thus relatively accurate. It need not, for instance, use an approximation of the further object as a point source or sink of lines of sight.

In an embodiment, the further object extends across at least a major part of a dimension of the surface, so as to define regions of the surface separated by the further object.

A user can partition the surface into regions of variable extent by moving the further object. The further object simplifies the determination of the position of the object to be located, by cutting out signals crossing a region other than that in which the object to be located is present. This effect is pronounced where other objects are placed on the surface in the other region. Under such circumstances and in the absence of the further object, the pattern of normally clear lines of sight would be quite complicated. Because the further object includes wireless transmitters and/or receivers, the accuracy of the method is not impaired to the extent that it would be if only a screen were to be placed across the surface.

A variant of this method includes identifying normally clear lines of sight blocked by the object by evaluating responses of the receivers of at least some of only those pairs of a transmitter and a receiver able to detect a signal from the transmitter that define lines of sight across one of the regions.

An effect is that the method operates relatively efficiently. The object to be located can only block a sub-set of all normally clear lines of sight. Consequently only a sub-set of all receiver responses needs to be evaluated.

In an embodiment, the further object is constrained in its movement across the surface to translations substantially parallel to a line of sight defined by a pair of a wireless transmitter and receiver of which one is included in the further object.

An effect is that it is easier to locate the further object, and from its position to infer the locations of lines of sight terminating at the further object. In this respect, whether the movement is substantially parallel is measured with reference to the divergence angle of a beam of radiation emitted by the transmitter of the pair and the angle of the field of view of the receiver of the pair of elements defining the line of sight.

An embodiment, wherein the further object includes a drive apparatus for propelling the further object across the surface, the method includes controlling the drive apparatus remotely from the further object to position the further object on the surface.

An effect is that automatic control of the further object to improve the accuracy with which the position of the object to be located is determined is made possible. In another embodiment, the position of the further object can be estimated by dead reckoning on the basis of the directed movements of the further object.

According to another aspect, the system of the present invention comprises a control apparatus for controlling a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other, the control apparatus being arranged to activate the wireless transmitters in the presence of the object, and to identify normally clear lines of sight blocked by the object by evaluating responses of the receivers of at least some of the pairs of a transmitter and a receiver able to detect a signal from the transmitter, wherein the system further includes at least one further object, movable across the surface and including an element of at least one of the pairs of which the control apparatus is arranged to evaluate the response of the receiver.

In an embodiment, the control apparatus is associated with the surface, and the system further includes a communication link between the further object and the control apparatus.

The control apparatus is associated with the surface in the sense that is in position that is stationary with respect to the surface.

In an embodiment, the system is arranged to carry out a method according to the invention.

According to another aspect, the invention provides an object for movable arrangement on or over a surface and including an element of at least one of the pairs of which the control apparatus in a system according to the invention is arranged to evaluate the response of the receiver.

According to another aspect, the computer programme according to the invention includes a set of instructions capable, when incorporated in a machine readable medium, of causing a system having information processing capabilities and including a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other, to perform a method according to the invention and/or to constitute a system according to the invention.

BRIEF DESCRIPTION OF THE DRAWINGS

The invention will be explained in further detail with reference to the accompanying drawings, in which:

FIG. 8 is a schematic top view of the second system at a fourth stage in the method of FIG. 4.

DETAILED DESCRIPTION OF EMBODIMENTS

Figure 1:
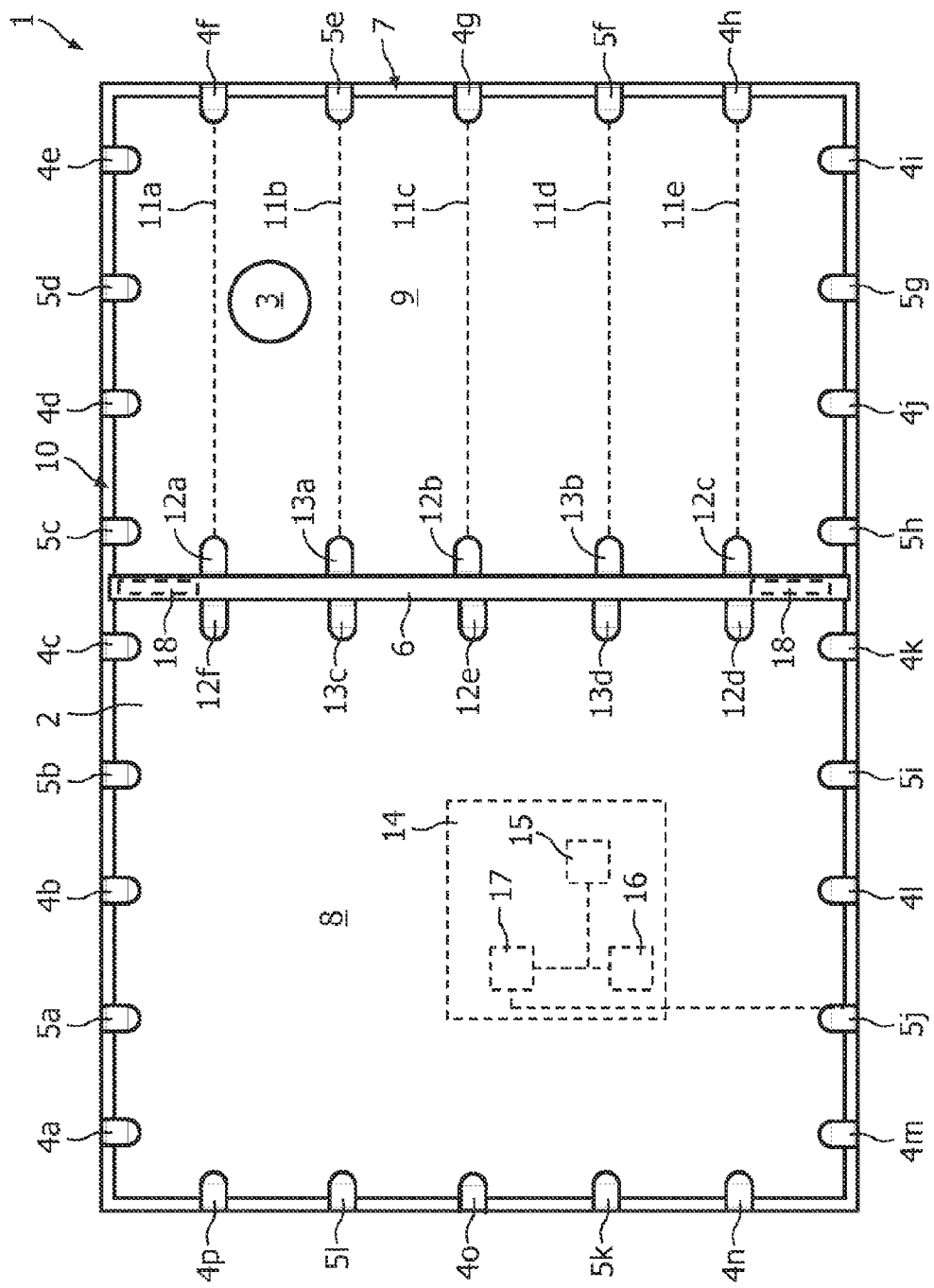
FIG. 1 is a schematic top view of a first system for locating an object on a surface.

In FIG. 1, an interactive system 1 is shown. It includes a surface 2 of finite extent, on which an object 3 may be placed, either in touching relationship or in close proximity to the surface 2. Although not shown in further detail in FIG. 1, in some embodiments, the surface 2 covers a screen of a display device. In other embodiments, the surface 2 is patterned into a playing surface for a board game. In the example, the surface 2 is rectangular, but in other embodiments it has another simply connected shape, for example a convex shape.

The interactive system 1 has the ability to locate the object 3, and any further objects (not shown), on the surface 2. In some embodiments, the system 1 is provided with logic to infer an input signal from the location of the object 2. In these embodiments, the interactive system 1 functions as a touch screen. In this connection, it is observed that, although examples are illustrated herein where the object 2 is an inanimate object, e.g. a pawn, the interactive system 1 is equally suitable for locating the position of a user's finger placed on or over the surface 2.

The interactive system is provided with a plurality of active elements. These include peripheral transmitters 4a-4p and peripheral receivers 5a-5l. The peripheral transmitters 4 and peripheral receivers 5 are placed at a perimeter of the surface 2. The peripheral transmitters 4 comprise wireless transmitters, arranged, in use, to emit a directed beam of radiation with a divergence angle, determining a particular region of coverage of the surface 2. It is noted that the beams are emitted in a direction lying in a plane substantially parallel to the surface 2. In the examples detailed herein, the peripheral transmitters 4 are optical transmitters, e.g. Light Emitting Diodes (LEDs). Ultrasonic transmitters or transmitters of electromagnetic radiation at non-visible wavelengths are used in other embodiments. The peripheral receivers 5 comprise photodiodes. In other embodiments, another type of optical sensor may be used. In the embodiments to be discussed herein, the peripheral receivers 5 have a relatively wide-angled field of view. They are thus able to detect light from peripheral transmitters 4 not located directly opposite them.

The peripheral transmitters 4a-4p and peripheral receivers 5a-5l are positioned such that, in the absence of the object 3, light emitted by one of the transmitters 4a-4p can be detected by one or more peripheral receivers 5a-5l. A peripheral transmitter 4a-4p forms a pair with each peripheral receiver 5a-5p able to detect light emitted by it in the absence of objects on the surface 2. An imaginary line between the elements of such a pair is termed a line of sight herein.

In order to allow the object 3 to be located in two dimensions, at least some of all the lines of sight defined by all possible pairs of peripheral transmitters 4a-4p and peripheral receivers 5a-5l cross at least some other lines of sight.

The interactive system 1 illustrated in FIG. 1 further includes a movable barrier 6. The movable barrier 6 extends over more than half of a dimension corresponding to a short side 7 of the surface 2. In fact, it extends completely over the surface 2, so as to divide the surface 2 into a left region 8 and a right region 9. In another embodiment, the movable barrier 6 extends over a major part of a dimension of the surface 2 corresponding to a long side 10. In other embodiments, a major part corresponds to a value between 50% and 100% of the distance between opposite edge points of the surface 2, e.g. 70%, 80% or 90%.

The movable barrier 6 is constrained to carry out translational movements in a direction substantially parallel to the long side 10. It is to be noted that, in the illustrated embodiment, this direction is also substantially parallel to lines 11a-11e defined by pairs of elements in a set formed by peripheral transmitters 4f-4h on the short side 7, peripheral receivers 5e,5f on the short side 7, and receivers 12a-12c and transmitters 13a-13b included in the movable barrier 6. Where the aperture of the receivers 5e,5f,12a-12c is so small that only the light from transmitters 4f-4h,13a,13b directly opposite is detected, movement of the movable barrier 6 in a direction parallel to the lines 11a-11e of sight does not need to be followed by re-calibration. In embodiments where light is emitted and detected at wider angles, the constrained movement simplifies the re-calibration process, in which normally clear lines of sight are identified for each peripheral transmitter.

In the illustrated embodiment, a control apparatus 14 is associated with the surface 2, by being included in the device of which the surface 2 is a part. The control apparatus 14 includes a processor 15 and memory 16, as well as a transceiver 17. The transceiver 17 is provided for signalling between the control apparatus 14 and the peripheral transmitters 4a-4p, the peripheral receivers 5a-5l, receivers 12a-12f included in the movable barrier 6, transmitters 13a-13d included in the movable barrier 6 and a drive apparatus 18 included in the movable barrier 6.

The drive apparatus 18 allows the control apparatus 14 to position the movable barrier 6 with respect to the surface 2. Thus, the relative sizes of the left and right regions 8,9 can be adjusted. Where the peripheral transmitters 4 and/or transmitters 13 included in the movable barrier 6 emit light over a relatively wide angle, movement of the barrier 6 will affect the number of peripheral receivers 5 and/or receivers 12 included in the movable barrier 6 with which they define lines of sight.

Figure 2:
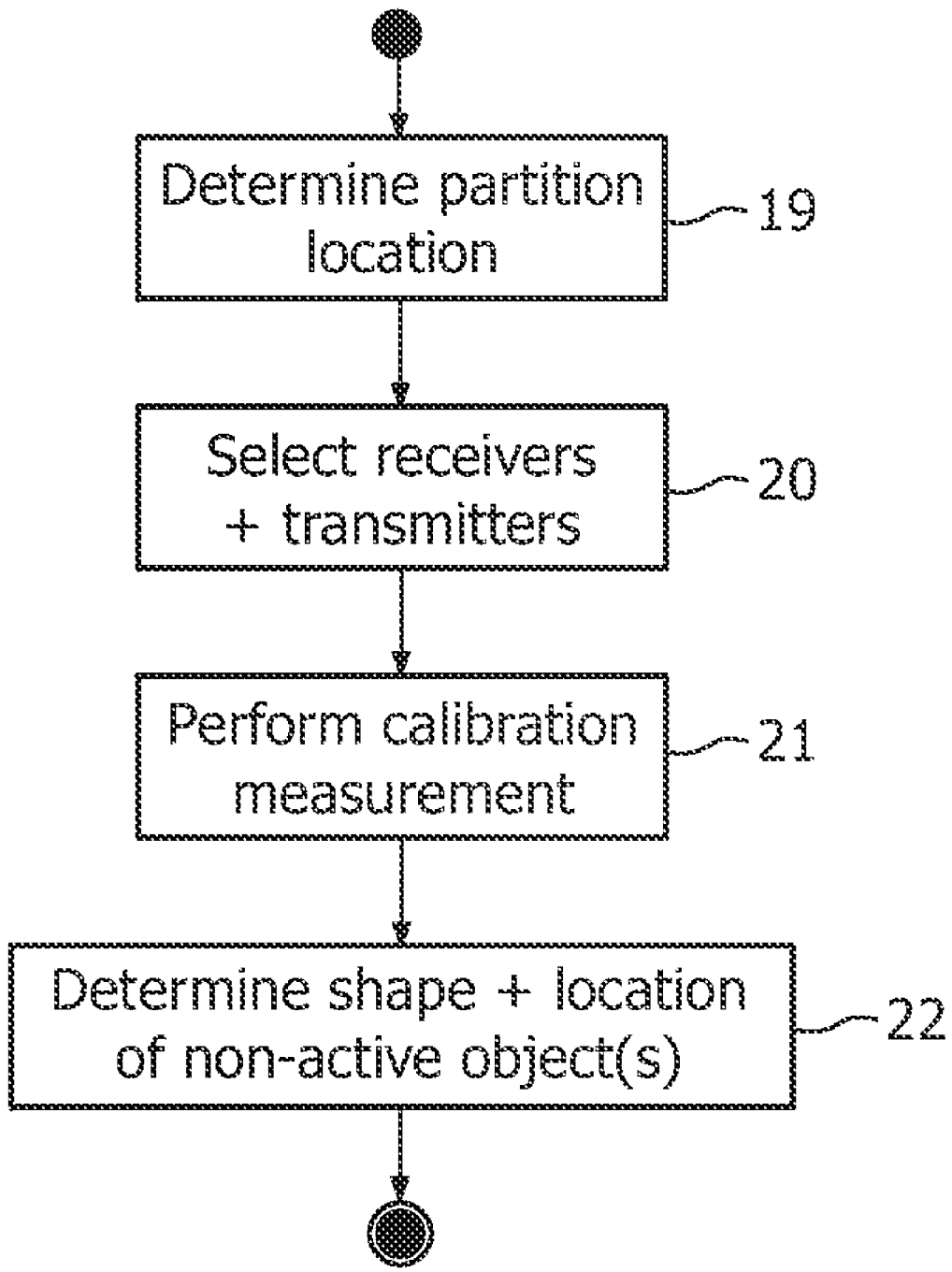
FIG. 2 is a flow chart representing an outline of a method for use in connection with the first system.

FIG. 2 illustrates a method carried out by the control apparatus 14. In a first step 19, the position of the movable barrier 6 is determined. Where the control apparatus 14 controls the position of the movable barrier 6 by means of the drive apparatus 18, this step 19 can involve a form of dead reckoning. In an alternative embodiment, a row of transducers (not shown) at the long side 10 of the surface 2 communicates the position of the movable barrier 6 to the control apparatus 14 through the transceiver 17. In yet another embodiment, one or more of the peripheral transmitters 4a-4p may be activated in turn, with the position of the movable barrier 6 being inferred from the identity of those peripheral receivers 5a-5l and/or receivers 12a-12f included in the movable barrier 6 able to detect the emitted light. Thus, the movable barrier 6 is located on the surface 2 in this first step 19.

In a next step 20, it is determined in which of the left and right regions 8,9 the object 3 is to be located. In the illustrated embodiment, only those elements covering the right region 9 are used to locate the object 3.

A calibration measurement is performed (step 21) in the absence of the object 3. With this measurement, it is determined for each of the selected peripheral transmitters 4d-4j and transmitters 13a,13b included in the movable barrier 6, which of the peripheral receivers 5c-5h and receivers 12a-12c included in the movable barrier 6 are able to detect a signal from that peripheral transmitter or transmitter included in the movable barrier 6. Thus, pairs of elements defining normally clear lines of sight are determined, wherein elements of at least some of the pairs are included in the movable barrier 6.

Next, the normally clear lines of sight blocked by the object 3 are identified (step 22) by evaluating for each transmitter 4d-4j, 13a,13b in turn, the responses of peripheral receivers 5c-5h and receivers 12a-12c included in the movable barrier 6 able to detect the signal from that transmitter in the absence of the movable object 3. With this information, the shape and location of the (passive) object 3 can be determined. Of course, the accuracy with which the shape and location are determined depends on the number and placement of the elements. To that extent, an estimate of the shape and location is determined in the final step 22.

The method by which the shape and location of the object 3 is inferred from the identification of blocked normally clear lines of sight may be one of several. Where the peripheral transmitters 4d-4j, transmitters 13a,13b included in the movable barrier 6, peripheral receivers 5c-5h and receivers 12a-

12c included in the movable barrier 6 are configured such that there is only one line of sight from each transmitter, and the lines of sight form a regular grid, then it is simply enough to approximate the location and shape by the squares or rectangles of the grid defined by crossing blocked lines of sight.

In most embodiments, a variant of the methods outlined in WO 2006/095320 is used. Reference is made to that publication for implementation details. Briefly stated, the method involves continuous execution of the final step 22 over multiple cycles of operation. Within a single cycle of operation each transmitter is turned on for a pre-determined turn-on time. During each cycle of operation in the operational mode, minimum and maximum area estimates are made and stored for each light transmitter. A minimum area estimate is determined as a region bounded by lines from the transmitter and the outermost ones of the blocked normally clear lines of sight and the edge of the right region 9 between those receivers. The maximum area estimate is defined by points including the receivers adjacent to those defining corners of the minimum area. The minimum and maximum area estimates, once determined, are stored for each light transmitter for the current cycle of operation. After a complete cycle of operation, the stored minimum and maximum area estimates are retrieved. The maximum area estimates for each of the light transmitters over one cycle of operation are combined through a mathematical intersection to derive a maximum area result. The minimum area estimates are combined through a mathematical intersection to achieve a total minimum area result. The minimum area result is then combined through a mathematical intersection with the maximum area result to ensure that the minimum area is completely inside the maximum area.

It will be clear from the above that the final step 22 is repeatedly carried out in the presence of a moving object, whereas the preceding steps 19-21 need only be carried out once at the start and every time the movable barrier 6 is displaced.

Figure 3:
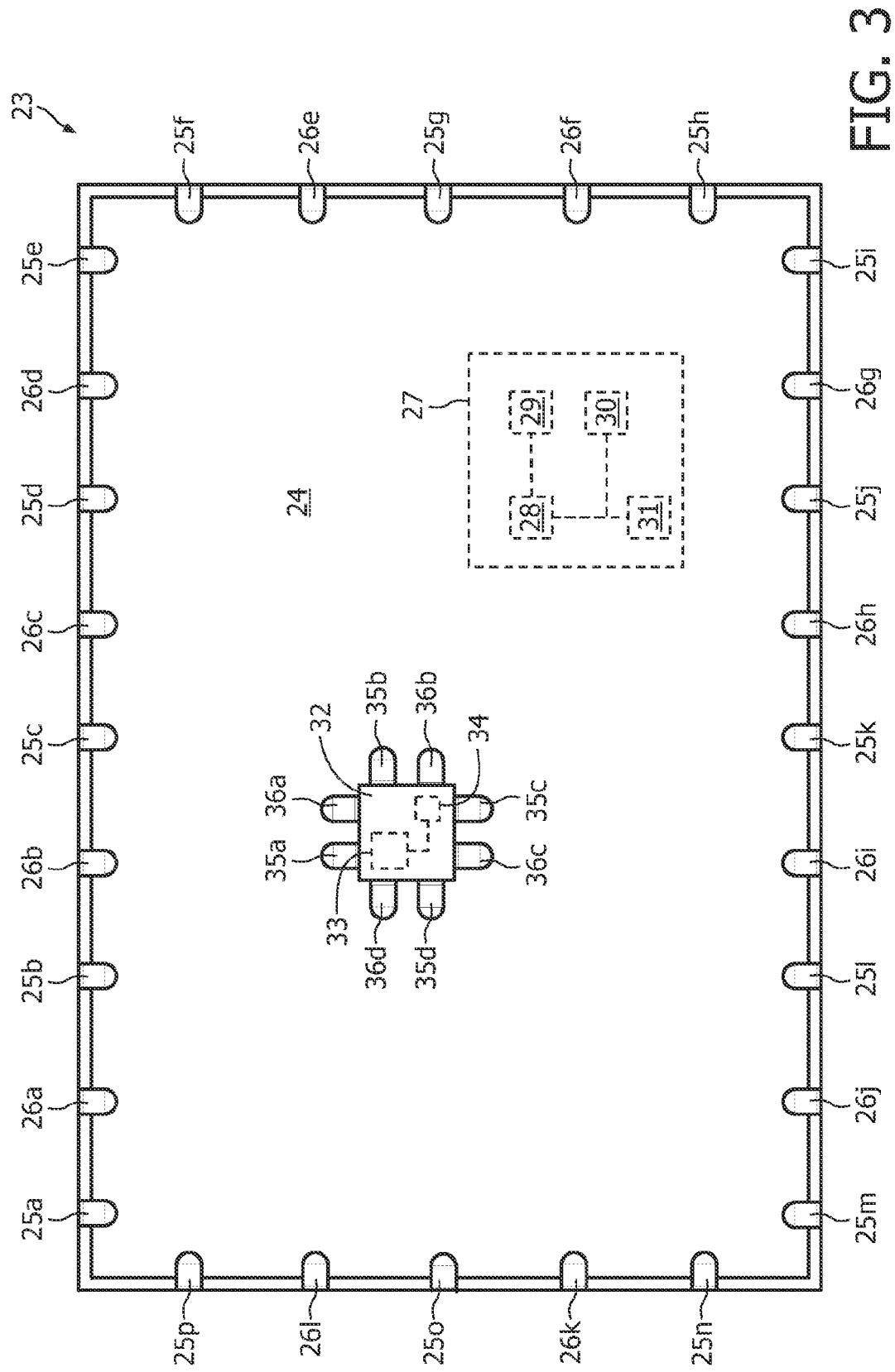
FIG. 3 is a schematic top view of a second system for locating an object on a surface.

FIG. 3 shows a second interactive system 23. It includes a surface 24 of finite extent, on which objects may be placed, either in touching relationship or in close proximity to the surface 24. Also in variants of this embodiment, the surface 24 covers a screen of a display device. In other variants, the surface 24 is opaque and patterned into a playing surface for a board game.

The second interactive system 23 is provided with a plurality of active elements. These include peripheral transmitters 25a-25p and peripheral receivers 26a-26l. The peripheral transmitters 25 and peripheral receivers 26 are placed at a perimeter of the surface 24. The peripheral transmitters 25 and peripheral receivers 26 correspond to the peripheral transmitters 4 and peripheral receivers 5 of the interactive system 1 illustrated in FIG. 1 and described above.

A control apparatus 27 includes a processor 28 and memory 29. The control apparatus 27 further includes a wired transceiver 30 for individually activating the peripheral transmitters 25 and for obtaining response signals from the peripheral receivers 26. A wireless transceiver 31 is provided as well. An example is compliant with the Bluetooth or Zigbee standards. In an alternative embodiment, the wireless transceiver 31 is configured to emit and receive Infrared communications signals.

One active object 32 is illustrated in FIG. 3. The active object 32 is movable across the surface 24, in the sense that it can be lifted off the surface 24 and placed at a different location. The active object 32 includes a controller 33 and a wireless transceiver 34 configured to exchange data with the wireless transceiver 31 of the control apparatus 27. In an alternative embodiment, the wireless transceiver 31 is omitted, the active object 32 includes a wired transceiver, and a wired communications link is provided between the control apparatus 27 and the active object 32.

In a variant of the second interactive system 23, the active object 32 includes a drive apparatus for propelling the active object 32 across the surface 24. The control apparatus 27 controls the drive apparatus remotely to position the active object 32 on the surface 24. In one variant, this allows the second system 23 to implement a game, where the active object 32 represents one of the playing pieces of the player's opponent, for example.

The active object 32 also participates in locating further objects on the surface 24. To this end, it includes further transmitters 35a-35d and further receivers 36a-36d of the same type as the peripheral receivers 26 and peripheral transmitters 25. The peripheral transmitters 25, further transmitters 35, peripheral receivers 26 and further receivers 36 are, as can be seen, in such a configuration as to form a plurality of pairs of a transmitter and a receiver able to detect a signal from the transmitter in the absence of the object or objects to be located. As in the embodiment of FIG. 1, each such pair of transmitter and receiver defines one of a plurality of normally clear lines of sight, at least some of which are at an angle to each other. This is true regardless of the position of the active object 32.

Figure 4:
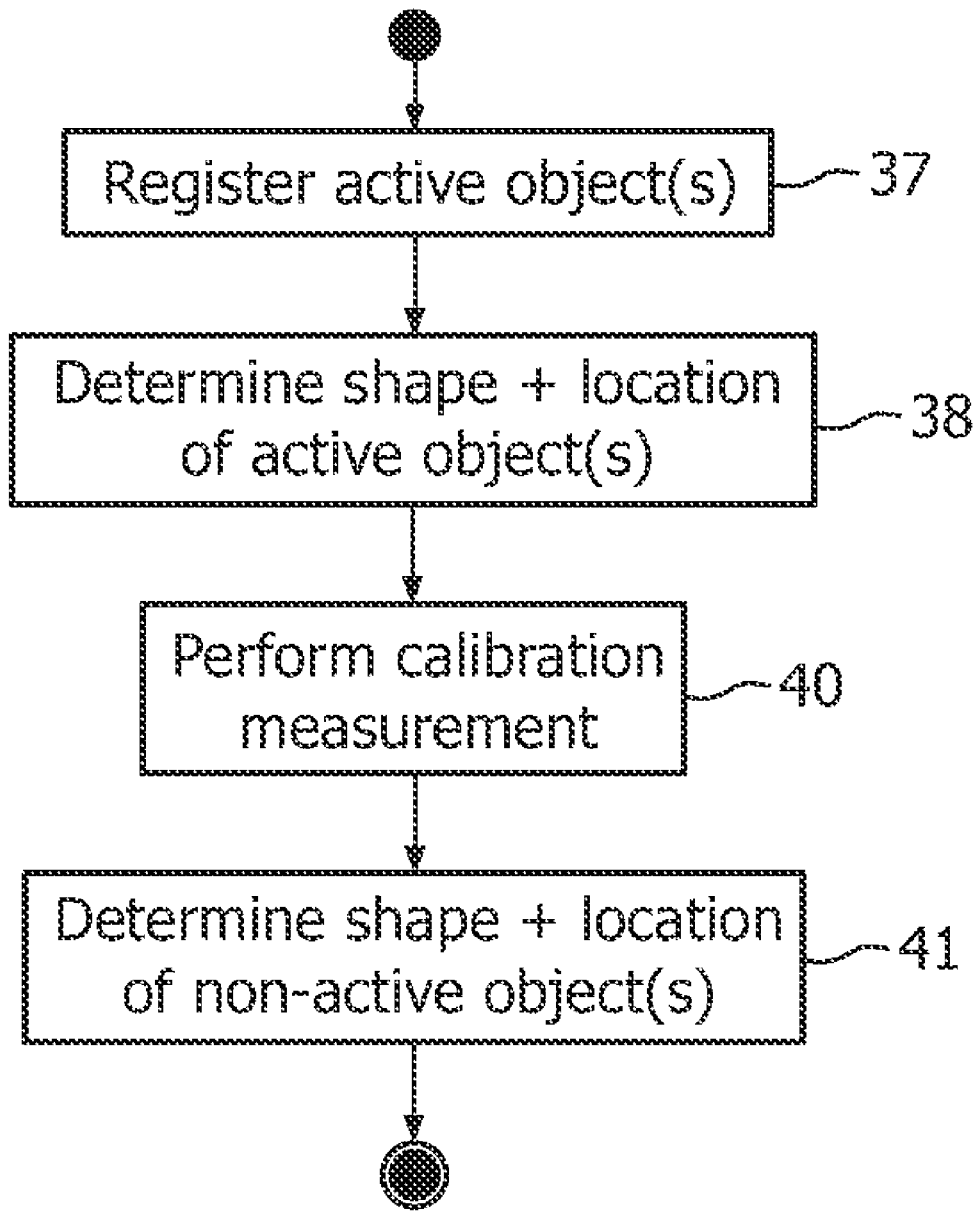
FIG. 4 is a flow chart representing an outline of a method for use in connection with the second system.

FIG. 4 illustrates an embodiment of a method carried out by the second interactive system 23 under the control of the control apparatus 27. FIGS. 5-8 illustrate phases during the execution of the method.

In order to accommodate a variable number of further active objects in addition to the active object 32, a first step 37 includes registering the active object 32 and any further active objects (not shown, for reasons of clarity). The active object 32 signals its presence to the control apparatus 27, for example using the communications link provided by the wireless transceivers 31,34. In one embodiment, it signals its presence in response to a signal emitted by the control apparatus 27 and addressed to no active object in particular. In another embodiment, it continually signals its presence until an acknowledgment is received from the control apparatus 27 associated with the surface 24.

Upon registering the active object 32, the control apparatus 27 determines its position on the surface 24 (step 38). In variants in which the control apparatus 27 controls a drive apparatus in the active object 32 to position the active object 32 on the surface 24, it may be sufficient to use a system of dead reckoning to implement this step 38. In the illustrated example, the position of the active object 32 is determined using the method described in WO 2006/095320 and above, but using only the peripheral transmitters 25 and the peripheral receivers 26.

Figure 5:
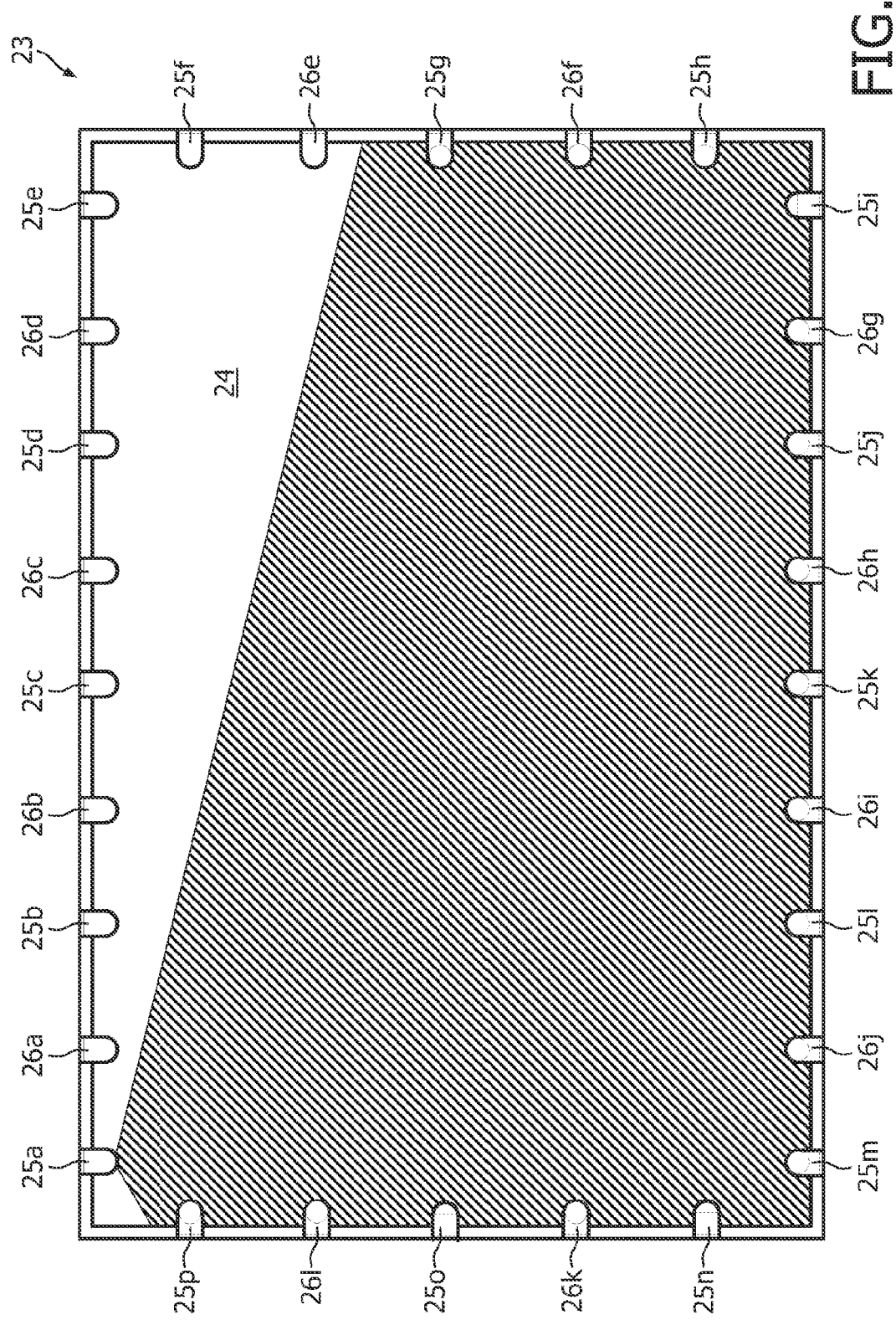
FIG. 5 is a schematic top view of the second system at a first stage in the method of FIG. 4.

FIG. 5 shows one step in a calibration cycle, carried out in the absence of the active object 32. Each of the peripheral transmitters 25a-25p is activated in turn, and those of the peripheral receivers 26a-26l able to detect the light emitted by that peripheral transmitter 25 are recorded in a table against the activated peripheral transmitter 25. Thus, as illustrated in FIG. 5, when a first peripheral transmitter 25a is activated by the control apparatus 27 by providing the appropriate signal through the wired transceiver 30, peripheral receivers 26f-26l are recorded against the first peripheral transmitter 25a. The pairs of the first peripheral transmitter 25a and each respective one of those peripheral receivers 26f-26l able to detect its signal define normally clear lines of sight.

Figure 6:
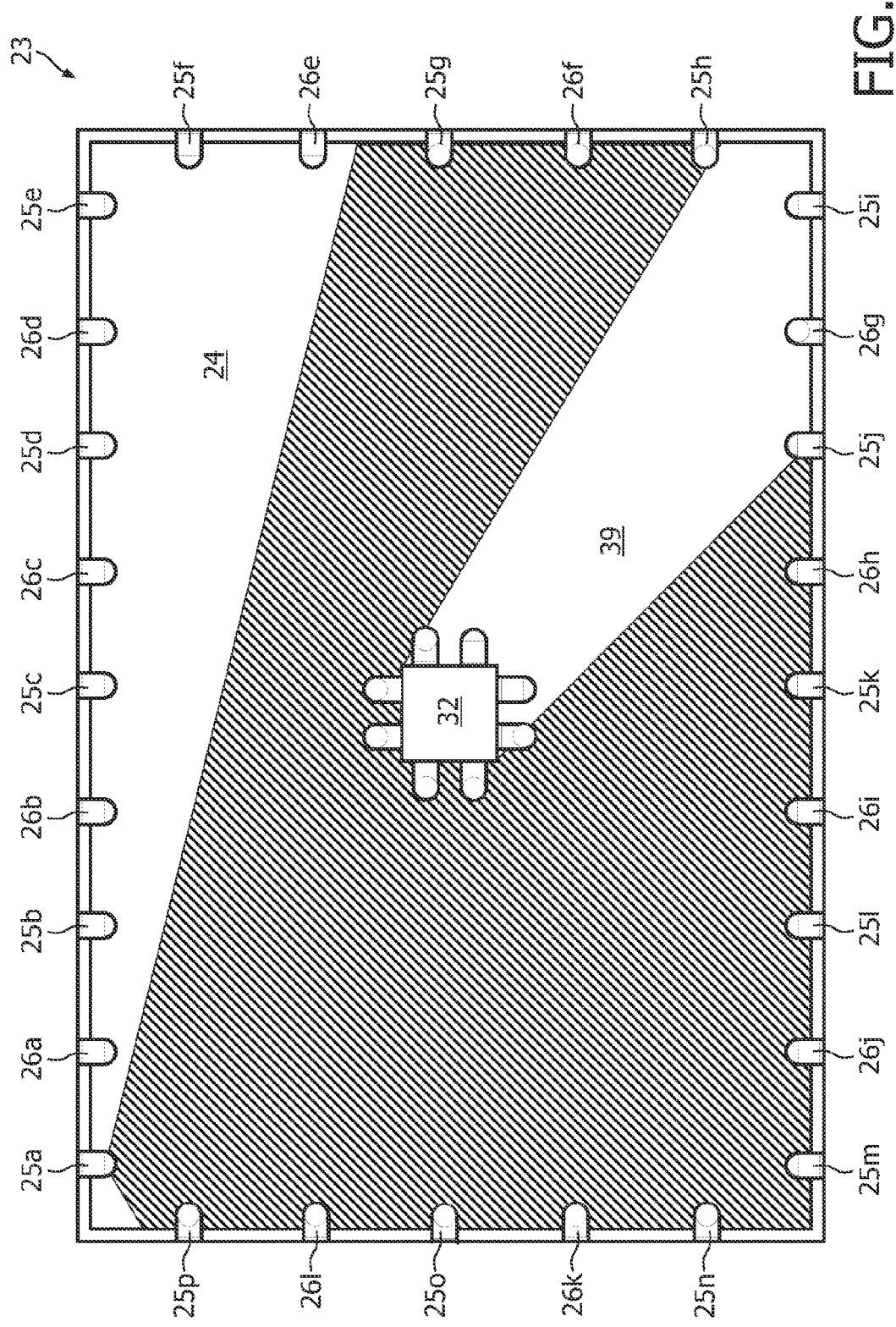
FIG. 6 is a schematic top view of the second system at a second stage in the method of FIG. 4.

In the presence of the active object 32 (FIG. 6), the peripheral transmitters 25a-25p are again activated in turn by the control apparatus 27. FIG. 6 shows the situation when the first peripheral transmitter 25a is activated. The shadow cast by the active object 32 covers an area 39. The minimum estimate of this area is empty in this case, because only one line of sight between the first peripheral transmitter 25a and a peripheral receiver 26g is blocked. The maximum area estimate is an area defined by the first peripheral transmitter 25a, the lower right-hand corner of the surface 24 and the first peripheral receivers 26f, 26h not covered by the shadow area 39.

After minimum and maximum area estimates have been obtained for each of the peripheral transmitters 25a-25p, the area covered by the active object 32 is determined in the manner outlined above with regard to the first interactive system 1 and in WO 2006/095320.

It is noted that in this step 38, the shape of the active object 32 is determined in relation to the surface 24. Using knowledge of its configuration, in particular the relative location of the edges of the active object 32, its orientation about an axis normal to the surface 24 can be determined. Thus, the control apparatus 27 is able to infer the locations of the further transmitters 35 and further receivers 36 included in the active object 32. In principle, this knowledge can be used to skip a next step 40 of the example, in which a further calibration measurement is carried out, in the presence of the active object 32, but in the absence of any inactive objects.

In this step 40, the further transmitters 35a-35d are also activated in turn, and the responses of the further receivers 36a-36d and peripheral receivers 26a-26l are evaluated to identify normally clear lines of sight. Some of these lines of sight terminate at the active object 32, of course.

Figure 7:
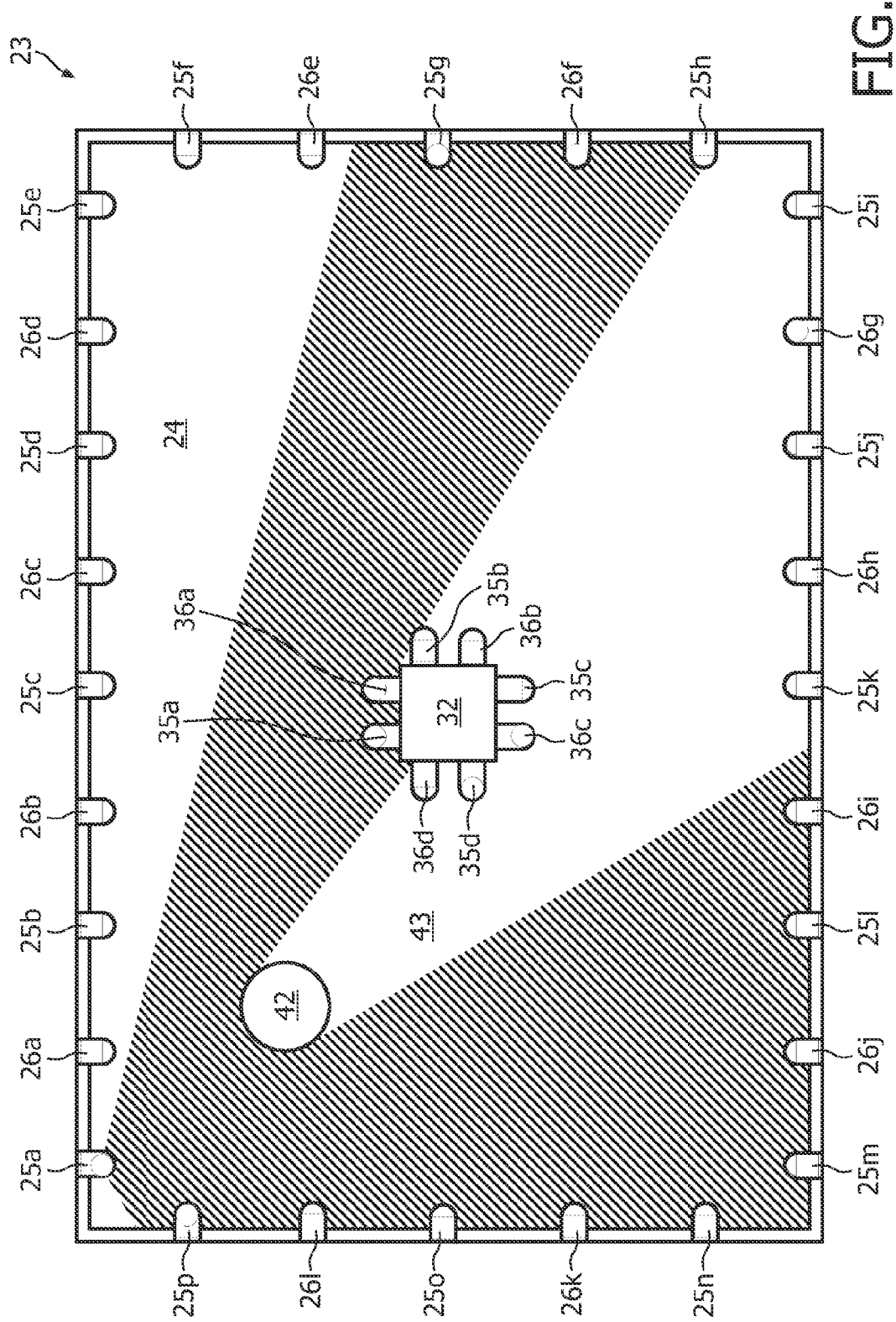
FIG. 7 is a schematic top view of the second system at a third stage in the method of FIG. 4.

FIGS. 7 and 8 illustrate a final step 41, which is carried out repeatedly for as long as the active object 32 does not change position. In this step 41, each of the peripheral transmitters 25a-25p and further transmitters 35a-35d is activated in turn, and the responses of the peripheral receivers 26a-26l and further receivers 36a-36d are evaluated in order to identify normally clear lines of sight blocked by an inactive object 42 placed on the surface 24. Having identified the normally clear lines of sight that are blocked, respective minimum area estimates and maximum area estimates of the inactive object 42 are made for each of the peripheral transmitters 25a-25p and further transmitters 35a-35d. These are combined to determine the shape and location of the inactive object 42.

The use of the active object 32 including the further transmitters 35a-35d and further receivers 36a-36d improves the accuracy of the estimate due to the proximity of the further transmitters 35a-35d and further receivers 36a-36d to the inactive object, and the close mutual spacing of these elements.

FIG. 7 shows the situation where the first peripheral transmitter 25a is activated. The inactive object 32 casts a shadow defining a shadow area 43 on the surface 24. Of the four further receivers 36a-36d, a first and fourth receiver 36a, 36d, counting clockwise around the edges of the active object 32, are normally able to detect light from the first peripheral transmitter 25a. Thus, for the first peripheral transmitter 25a, the minimum area is defined by the first peripheral transmitter 25a itself, the fourth further receiver 36d and a peripheral receiver 26h. The maximum area is defined by the first peripheral transmitter 25a, the first further receiver 36a and another peripheral receiver 26i. It will be apparent that the elements included in the active object 32 reduce the minimum and maximum area estimates associated with the first peripheral transmitter 25a.

FIG. 8 illustrates the situation where the first further transmitter 35a included in the active object 32 is activated. In this case, the minimum and maximum area estimates are empty, because the inactive object 42 blocks no normally clear lines of sight between the first further transmitter 35a and one of the peripheral receivers 26a-26l. These estimates are not taken into account when determining the position and shape of the inactive object 42. In a variant in which the active object 32 includes a drive apparatus, the active object 32 may be moved at this stage, in order to establish lines of sight that are blocked by the inactive object. In that case, the two preceding steps 38,40 would be repeated.

By including at least one further element, e.g. at least one further transmitter 35 and/or receiver 36 in the movable active object 32, additional lines of sight can be provided in a region of the surface 24 in which an inactive object 42 is present. Thus, further minimum area and maximum area estimates with a higher resolution are provided to establish the total minimum area estimate and total maximum are estimate. In the end, the shape and position of the inactive object 42 can thus be determined with a higher resolution. Moreover, separate inactive objects located in close proximity to each other can be distinguished where they would otherwise be perceived as a single object.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In variants, fewer than all of the transmitters may be activated in turn to obtain fewer than the maximum possible number of minimum and maximum area estimates, if it is determined that some of the transmitters emit signals in a direction away from the object to be located. The embodiments of FIG. 1 and FIGS. 5-7 may be combined, such that both the active object 32 and the movable barrier 6 are placed over a particular surface. The number of peripheral transmitters 4,25 and peripheral receivers 5,26 will tend to be higher in practical embodiments than is shown in the drawings.

The invention claimed is:

1. A method of locating an object placed on a surface, the method comprising the steps of:
    providing a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other;
    providing a further object that comprises at least one element of the plurality of pairs of a transmitter and a receiver;
    activating at least some of the wireless transmitters in the presence of the object; and
    identifying normally clear lines of sight blocked by the object by evaluating responses of the receivers of at least some of the pairs of a transmitter and a receiver able to detect a signal from the transmitter, wherein identifying normally clear lines of sight blocked by the object further comprises (i) evaluating responses of the receivers of the at least one element of one of the pairs included in said further object, and (ii) partitioning the surface into regions of variable extent by moving said further object across the surface, wherein the further object simplifies determination of a position of the object to be located by cutting out signals crossing a region other than that in which the object to located is present.

2. The method as claimed in claim 1, wherein the method further comprising the step of:
   establishing a communication link between the further object and a control apparatus associated with the surface.

3. The method as claimed in claim 2, wherein the communication link is a wireless communication link.

4. The method as claimed in claim 1, wherein a control apparatus locates the further object on the surface.

5. The method as claimed in claim 2, wherein the further object signals its presence to the control apparatus, and wherein the method further comprises the steps of:
   registering the further object including the at least one element; and
   locating the further object on the surface upon its registration.

6. The method as claimed in claim 1, wherein said method further comprises the step of:
   determining an orientation of the further object relative to a co-ordinate system fixed with respect to the surface.

7. The method as claimed in claim 1, wherein the further object is provided with plurality of edges at an angle to each other in a plane parallel to the surface, and wherein the method further comprises the step of:
   determining the shape of the further object by identifying normally clear lines of sight blocked by the further object and defined by pairs of a transmitter and a receiver arranged around the further object.

8. The method as claimed in claim 1, wherein the further object extends across at least a major part of a dimension of the surface, so as to define regions of the surface separated by the further object.

9. The method as claimed in claim 8, wherein said method further comprises the step of:
   identifying normally clear lines of sight blocked by the object by evaluating responses of the receivers of at least some of only those pairs of a transmitter and a receiver able to detect a signal from the transmitter that define lines of sight across one of the regions.

10. The method as claimed in claim 1, wherein the further object is constrained in its movement across the surface to translations parallel to a line of sight defined by a pair of a wireless transmitter and receiver of which one is included in the further object.

11. The method as claimed in claim 1, wherein the further object includes a drive apparatus for propelling the further object across the surface, and wherein the method further comprises the step of:
   controlling the drive apparatus remotely from the further object to position the further object on the surface.

12. A system for locating an object placed on a surface, the system comprising:
   a control apparatus for controlling a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other;
   the control apparatus further for activating at least some of the wireless transmitters in the presence of the object, and identifying normally clear lines of sight blocked by the object by evaluating responses of the receivers of at least some of the pairs of a transmitter and a receiver able to detect a signal from the transmitter; and
   at least one further object that comprises at least one element of the plurality of pairs of a transmitter and a receiver, wherein said control apparatus is further for identifying normally clear lines of sight blocked by the object that further comprises (i) evaluating responses of the receivers of the at least one element of one of the pairs included in said at least one further object, and (ii) partitioning the surface into regions of variable extent by moving said at least one further object across the surface, wherein said at least one further object simplifies determination of a position of the object to be located by cutting out signals crossing a region other than that in which the object to located is present.

13. The system as claimed in claim 12, wherein the control apparatus is associated with the surface, and wherein the system further comprises a communication link between the further object and the control apparatus.

14. The system as claimed in claim 12, wherein said system is arranged to carry out a method of locating an object placed on a surface, the method comprising the steps of:
   providing a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other;
   activating at least some of the wireless transmitters in the presence of the object; and
   identifying normally clear lines of sight blocked by the object by evaluating responses of the receivers of at least some of the pairs of a transmitter and a receiver able to detect a signal from the transmitter, wherein at least one element of one of the pairs of which the response of the receiver is evaluated is included in a further object, said further object being movable across the surface.

15. An object for movable arrangement on or over a surface and including an element in such a configuration to form part of at least some of the pairs of a transmitter and a receiver of which the control apparatus in the system as claimed in claim 12 is arranged to evaluate the response of the receiver.

16. A non-transitory computer-readable medium having stored thereon a computer program including a set of instructions for causing a system, having information processing capabilities and including a plurality of elements including a plurality of wireless transmitters and a plurality of wireless receivers, in such a configuration as to form a plurality of pairs of a transmitter and a receiver able to detect a signal from the transmitter in the absence of the object, each such pair defining one of a plurality of normally clear lines of sight, at least some of which are at an angle to each other, to perform the method as claimed in claim 1.

17. The object as claimed in claim 15, wherein said object further comprises a drive apparatus for positioning the object with respect to the surface.

* * * * *